Nov. 26, 1963    M. RIECKE    3,112,032
SLIDE-RETAINING ATTACHMENT
Filed Feb. 23, 1961
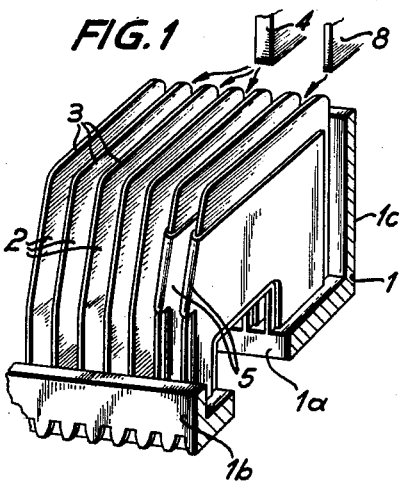
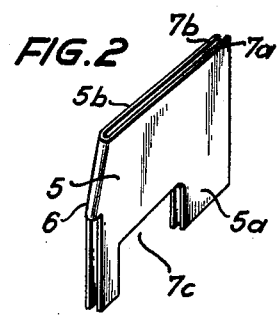
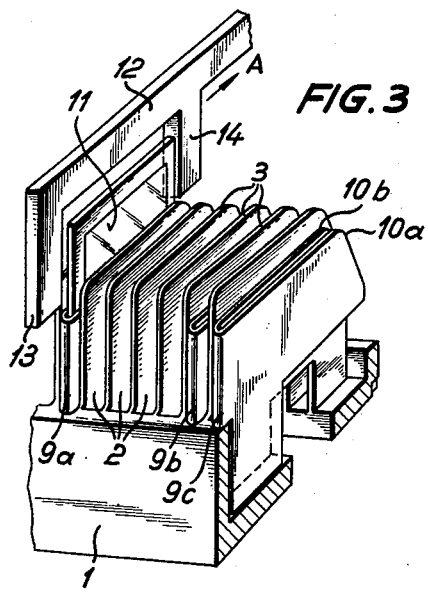
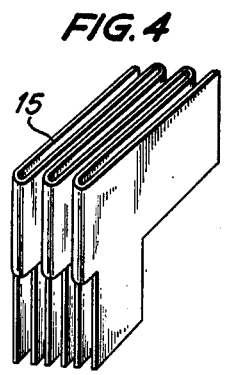
INVENTOR
MANFRED RIECKE
By Toulmin & Toulmin
ATTORNEYS

United States Patent Office 3,112,032
Patented Nov. 26, 1963

3,112,032
SLIDE-RETAINING ATTACHMENT
Manfred Riecke, Wetzlar (Lahn), Germany, assignor to Ernst Leitz Gesellschaft mit beschrankter Haftung, Wetzlar (Lahn), Germany
Filed Feb. 23, 1961, Ser. No. 91,089
Claims priority, application Germany Mar. 1, 1960
4 Claims. (Cl. 206—73)

The present invention relates to an attachment for a slide magazine, more particularly, to an attachable structure fitting into the magazine compartment to adapt the compartment to properly retain slides of varying thicknesses.

The conventional slide projector comprises a slide magazine having a plurality of slide compartments therein in which the slides are housed. The magazine is introduced into the slide projector and a slide-changing mechanism individually takes successive slides from the magazine, conveys them to a projecting position and then returns the slides to their original positions in the magazine.

Since the slide compartments must accommodate slides of varying thicknesses, the minimum width of the compartment is selected to accommodate the thickest slide. Accordingly, when a slide is used which has a thin thickness, the slide will not be properly supported in the compartment in that it will not be retained in a vertical position but in a sloping position. Occasionally it is difficult and impossible for the slide-changing mechanism to remove these tilted slides from the magazine. Either the slides are not properly picked up by the slide-changing mechanism or the slide-changing mechanism completely misses the slide.

In some forms of magazines wherein the sizes of the slide compartment walls are less than the height of a slide, these slides may be so tilted in their own compartments that they project above the next-adjacent slide compartment. It is therefore possible that the slide-changing mechanism may pick up not only the slide which is to be projected, but the tilted slide and accordingly malfunctioning of the slide-changing mechanism will occur.

The above discussed disadvantages can be eliminated by providing adapter means for vertically mounting slides of all thicknesses in the slide compartments of a slide magazine. Previously proposed solutions to this problem involve the use of springs or even the resilient mounting of the walls of the slide compartments.

These springs, however, introduce several undesirable features and add some disadvantages. Since the resiliently grouped slides are not free but clamped in position there is an increase in friction and noise during the slide-changing operation and an increased risk of scratching the slides. In addition, springs cannot be used where the slides are to be returned to the slide compartments by gravity. This arrangement is employed on those slide projectors where the projecting position of the slide is considerably higher than the slide magazine.

It is therefore the principal object of this invention to provide a novel and improved slide-retaining attachment for slide magazines.

It is another object of this invention to provide an attachable structure for ensuring that slides of varying thicknesses may be correctly positioned in the compartments of a slide magazine.

The disadvantages of the prior art structures as discussed above are eliminated and the objects of this invention achieved by providing a slide-adapter which fits in the slide compartments so as to reduce the space available in compartments for receiving a slide. These adapters or attachments are provided with a structure for being detachably mounted onto the walls of the magazine slide. These adapters are essentially U-shaped and are formed from sheet material so as to be readily inserted between the walls of a slide compartment. The extreme parts of the attachment are resilient so as to securely fix the adapter in the compartment.

The adapters are preferably constructed of a flat sheet material so that the sides thereof will closely lie against the walls of the slide compartment. Each adapter has two parts or faces which are in close engagement with the walls of the slide compartment.

The thicknesses of the faces of the adapter are such that the space between the faces corresponds to the thickness of the slide which is to be accommodated in that compartment.

The attachments may be conventionally made out of plastic materials. A plurality of these attachments may be fabricated as an integral unit so as to be inserted in a corresponding plurality of adjacent slide compartments.

Other objects and advantages of this invention will be apparent upon reference to the accompanying description when taken in conjunction with the following drawings, wherein FIGURE 1 is a perspective view of a portion of a slide magazine having the attachment of this invention mounted in a slide compartment;

FIGURE 2 is an overall perspective view of the slide adapter per se;

FIGURE 3 is a perspective view, similar to that of FIGURE 1, but additionally shows a slide-changing mechanism gripping a slide in a compartment provided with an adapter;

FIGURE 4 shows a slide attachment comprising a plurality of faces for inserting into a corresponding plurality of slide compartments.

A specific embodiment and a modification of the present invention will be next described with reference to the accompanying drawings, wherein like reference symbols indicate the same parts throughout the various views.

Returning now to FIGURE 1 there is shown a slide magazine 1 which is divided into a plurality of slide compartments 2 by compartment walls 3 which extend transversely of the slide magazine. The width of the slide compartments 2 is so chosen as to accommodate the thickest slide 4 which is normally used for slide projectors. The slide magazine has a longitudinally extending groove 1a which is used for raising the slides from the compartments. In addition, the wall 1b of the slide magazine which is adjacent the slide-changing mechanism is lower in height than the opposite wall 1c.

The attachment or adapter of this invention is indicated at 5 and is shown in detail in FIGURE 2.

The attachment essentially comprises a sheet member which is bent to form a pair of substantially parallel faces 5a and 5b which are interconnected by a reverse or U-bend 6. The ends of the attachment 7a and 7b are bent towards each other and since the attachment is made of a resilient material, the attachment can be secured on a compartment wall 3 of the slide magazine. The attachment also has a cutout portion 7c through which components of the slide-changing mechanism or other elements necessary for the operation of the slide projector may project.

As may be seen in FIGURE 1, by clamping two of the adapters to adjacent walls of a slide compartment, the slide compartment will be able to accommodate a slide which is considerably thinner than the normally used slide 4.

In FIGURE 3 there is illustrated a slide magazine 1 which has a plurality of slide attachments 9a, 9b, 9c positioned between the walls of the slide compartment. In this use of the attachment the ends 10a and 10b of the attachment are biassed outwardly so as to securely mount the attachment between the walls of a slide compartment.

There is further shown in FIGURE 3 a slide 11 which is retained in the slide compartment having the attachment 9a therein. The slide 11 is in the process of being gripped by the slide-changing mechanism indicated at 12 and having the gripping arms 13 and 14. The slide-changing mechanism will move in the direction indicated at A to remove the slide from the magazine.

The arrangement of FIGURE 3 is preferably used in those cases where it is desired to have slides of different thicknesses in adjacent slide compartments.

Proceeding next to FIGURE 4 there is shown a slide attachment 15 which comprises a plurality of attachments interconnected by reverse bends. The result is an integral unit having alternating open and closed sides. The attachment 15 can be positioned in a slide magazine so as to attach a plurality of successive compartments to receive comparatively thin slides.

Thus it can be seen that the present invention provides a simple apparatus for securely retaining thin slides in slide compartments which were originally constructed to accommodate slides of a greater thickness. The slide attachments can be economically made and can be constructed from plastic material so as to not scratch the slides.

It will be understood that this invention is susceptible to modifications in order to adapt it to different usages and conditions and, accordingly, it is desired to comprehend such modifications within this invention as may fall within the cope of the appended claims.

What I claim is:

1. A slide-retaining attachment for a slide structure magazine having a plurality of slide compartments and comprising a sheet member with spaced faces interconnected at one pair of the corresponding ends thereof and having a length substantially equal to the length of a slide compartment, said faces having such a width between the outer surfaces thereof so that said outer surfaces closely fit between the compartment walls of the magazine slide compartment to reduce the space within a slide compartment and the reduced space can closely accommodate a slide considerably thinner than the normal width of a slide, and resilient clip portions on the interconnected end of the sheet member to clamp onto the compartment walls of a magazine slide compartment to detachably hold the retaining attachment in position.

2. A slide-retaining attachment for a slide structure magazine having a plurality of slide compartments and comprising a sheet member with a plurality of spaced faces having such a width between the outer surfaces thereof so that said outer surfaces closely fit between the compartment walls of the magazine slide compartment to reduce the space within a slide compartment and the reduced space can closely accommodate a slide considerably thinner than the normal width of a slide, said sheet member having a plurality of alternating reverse bends at the ends of said faces so as to form a plurality of compartments whose ends are alternately opened and closed, alternate ones of said compartments having such a width between the inner surfaces of said faces so as to closely fit onto the compartment walls of a compartment of a slide magazine.

3. A slide-retaining attachment for a slide structure magazine having a plurality of slide compartments and comprising a U-shaped sheet member having spaced faces and having such a width between the outer surfaces thereof so that said outer surfaces closely fit between the compartment walls of the magazine slide compartment to reduce the space within a slide compartment and the reduced space can closely accommodate a slide considerably thinner than the normal width of a slide, the ends of said spaced faces of said U-shaped sheet member being resilient and bent outwardly so as to secure the attachment between the compartment walls of a slide compartment when positioned therein.

4. A slide-retaining attachment for a slide structure magazine having a plurality of slide compartments and comprising a U-shaped sheet member having spaced faces and having such a width between the inner surfaces of said faces so that said inner surfaces closely fit on both sides of a compartment wall of a slide compartment to reduce the space within a slide compartment and the reduced space can closely accommodate a slide considerably thinner than the normal width of a slide, the ends of said spaced faces of said U-shaped sheet member being resilient and being bent inwardly so as to secure said attachment on both sides of a compartment wall when positioned on said wall.

References Cited in the file of this patent

UNITED STATES PATENTS

| | | |
|---|---|---|
| 1,932,464 | Hyde | Oct. 31, 1933 |
| 2,864,491 | Paterson | Dec. 16, 1958 |
| 2,919,021 | Robinson et al. | Dec. 29, 1959 |